United States Patent
Tseng et al.

(10) Patent No.: US 9,531,106 B2
(45) Date of Patent: Dec. 27, 2016

(54) CONNECTOR MECHANISM AND ELECTRONIC DEVICE USING THE SAME

(71) Applicant: Wistron Corp., New Taipei (TW)

(72) Inventors: Tien-Chung Tseng, New Taipei (TW); Chih-Sheng Chou, New Taipei (TW)

(73) Assignee: WISTRON CORP., New Taipei (TW)

( * ) Notice: Subject to any disclaimer, the term of this patent is extended or adjusted under 35 U.S.C. 154(b) by 267 days.

(21) Appl. No.: 14/247,871

(22) Filed: Apr. 8, 2014

(65) Prior Publication Data

US 2015/0124384 A1 May 7, 2015

(30) Foreign Application Priority Data

Nov. 1, 2013 (TW) .............................. 102139793 A

(51) Int. Cl.
| | |
|---|---|
| *H01R 13/447* | (2006.01) |
| *H01R 13/453* | (2006.01) |
| *G06F 1/16* | (2006.01) |
| H01R 24/64 | (2011.01) |

(52) U.S. Cl.
CPC ........... *H01R 13/447* (2013.01); *G06F 1/1658* (2013.01); *H01R 13/453* (2013.01); *H01R 13/4532* (2013.01); *H01R 13/4536* (2013.01); H01R 24/64 (2013.01); H01R 2201/06 (2013.01)

(58) Field of Classification Search
CPC ... H01R 24/64; H01R 2201/06; H01R 13/447; H01R 13/4536; H01R 13/4532; H01R 13/453; G06F 1/1658
USPC ......................................... 439/138, 534, 563
See application file for complete search history.

(56) References Cited

U.S. PATENT DOCUMENTS

| | | | | |
|---|---|---|---|---|
| 6,135,802 A * | 10/2000 | Nakamura | ........... | H01R 13/453 439/138 |
| 6,361,334 B1 * | 3/2002 | Konoya | ............... | H01R 13/641 439/144 |
| 6,679,720 B2 * | 1/2004 | Nakamura | ......... | H01R 13/6271 439/352 |
| 8,337,222 B2 * | 12/2012 | Hung | ................... | H01R 13/447 439/138 |
| 8,986,023 B2 * | 3/2015 | Lee | ...................... | H01R 13/447 439/138 |
| 9,160,100 B2 * | 10/2015 | Du | ..................... | H01R 13/5841 |

(Continued)

FOREIGN PATENT DOCUMENTS

TW M450105 U 4/2013

*Primary Examiner* — Zachary M Pape
*Assistant Examiner* — Douglas Burtner
(74) *Attorney, Agent, or Firm* — Maschoff Brennan

(57) ABSTRACT

An electronic device comprises a case and a connector mechanism. The case comprises a bottom plate, a lateral plate and a pivoting base. The lateral plate is connected to the bottom plate, the lateral plate has an opening and the pivoting base is connected to the lateral plate. The connector mechanism comprises an electrical connector, a cover member and an elasticity-adjusting member. The electrical connector comprises an insulating base and a plurality of conductive terminals installed in the insulating base. A slot is formed in the insulating base and exposed to the opening. The cover member comprises a cover portion, a pivoting portion and an elastic portion all connected together, wherein the pivoting portion is positioned between the elastic portion and the cover portion while being disposed on the pivoting base.

23 Claims, 14 Drawing Sheets

(56) References Cited

U.S. PATENT DOCUMENTS

| | | | |
|---|---|---|---|
| 2002/0119693 A1* | 8/2002 | Chen | H01R 13/6272 439/358 |
| 2010/0248554 A1 | 9/2010 | Hung et al. | |
| 2010/0297892 A1* | 11/2010 | Ando | H01R 13/6275 439/701 |
| 2013/0260581 A1* | 10/2013 | Kuo | H01R 13/627 439/138 |
| 2014/0084762 A1* | 3/2014 | Lai | H05K 5/0221 312/223.1 |
| 2014/0134858 A1* | 5/2014 | Tseng | H01R 13/5213 439/136 |
| 2014/0134859 A1* | 5/2014 | Lee | H01R 13/447 439/136 |

* cited by examiner

CONNECTOR MECHANISM AND ELECTRONIC DEVICE USING THE SAME

CROSS-REFERENCE TO RELATED APPLICATIONS

This non-provisional application claims priority under 35 U.S.C. §119(a) on Patent Application No(s). 102139793 filed in Taiwan, R.O.C. on 2013 Nov. 1, the entire contents of which are hereby incorporated by reference.

TECHNICAL FIELD

The disclosure relates to a connection mechanism, more particularly to a connection mechanism for a thin electronic device and an electronic device using the connection mechanism.

BACKGROUND

Besides the decent hardware performance, nowadays customers also want their laptops to be thin and sleek. The interior space of the thin laptop, however, is significantly reduced so that the space allocation of the components thereof is different from that of the traditional computer. For instance, the edge of the thin laptop is designed to be extremely thin so slots with large width cannot be installed thereon. To address this issue, the related industries have launched connectors with less thickness for the thin laptops. Taking a half-sized RJ45 connector as an example, it is different from the traditional RJ45 connector which forms an annular and close-loop slot on an insulating base. Instead, the half-sized RJ45 connector only has a part of the structure of the traditional RJ45 connector. That is, the size of the insulating base of the half-sized RJ45 connector is half the size of that of the traditional RJ45 connector and this is sufficient for the installation of multiple conductive terminals. Additionally, a lateral cover is used for opening or covering the slot and an elastic tongue is disposed on the lateral cover to from a plug-connector for plugging into the slot having the same size of the traditional plug-connector. Thereby, the thickness of the electronic device is reduced and the functions thereof remain the same. Furthermore, an elastic member is often disposed between the lateral cover and the case. Thereby, when the slot is not used, the lateral cover can cover all of or part of the opening of the slot for better looking. When it is needed to use the slot, the lateral cover can be opened for the plug-connector to plug in the slot.

Nonetheless, when the elastic member installed on the lateral cover is not compatible, the elastic force of the elastic member could be too large for users to open it easily, or too small for the lateral cover to cover the slot firmly. In these cases, the technical staff needs to install the elastic member again, which is inefficient.

Moreover, elastic fatigue occurs when the elastic member is used too many times. As a result, the lateral cover may not move back to the default position, which needs to be repaired.

SUMMARY

An electronic device comprises a case and a connector mechanism. The case comprises a bottom plate, a lateral plate and a pivoting base. The lateral plate is connected to the bottom plate, the lateral plate has an opening and the pivoting base is connected to the lateral plate. The connector mechanism comprises an electrical connector, a cover member and an elasticity-adjusting member. The electrical connector comprises an insulating base and a plurality of conductive terminals installed in the insulating base. A slot is formed in the insulating base and exposed to the opening. The cover member comprises a cover portion, a pivoting portion and an elastic portion all connected together, wherein the pivoting portion is positioned between the elastic portion and the cover portion while being disposed on the pivoting base, thereby enabling the cover member to be pivotally disposed on the case near the opening and to face the electrical connector, so that the cover portion is configured to rotate relative to the case around an axis and to cover at least a part of the opening upon an elastic force operated by the elastic portion which has a moving end away from the pivoting portion. The elasticity-adjusting member is configured to move relative to the case and to be interfered with the moving end of the elastic portion. The elastic portion deforms with different elasticity value in response to the movement of the elasticity-adjusting member, thereby adjusting the restitutive force of the cover portion accordingly.

A connector mechanism, configured for being installed near an opening of a case, comprises an electrical connector, a cover member and an elasticity-adjusting member. The electrical connector comprises an insulating base and a plurality of conductive terminals installed in the insulating base. A slot is formed in the insulating base and exposed to the opening. The cover member comprises a cover portion, a pivoting portion and an elastic portion all connected together, wherein the pivoting portion is positioned between the elastic portion and the cover portion while being disposed on the pivoting base, thereby enabling the cover member to be pivotally disposed on the case near the opening and to face the electrical connector, so that the cover portion is configured to rotate relative to the case around an axis and to cover at least a part of the opening upon an elastic force operated by the elastic portion which has a moving end away from the pivoting portion. The elasticity-adjusting member is configured to move relative to the case and to be interfered with the moving end of the elastic portion. The elastic portion deforms with different elasticity value in response to the movement of the elasticity-adjusting member, thereby adjusting the restitutive force of the cover portion accordingly.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein.

DETAILED DESCRIPTION

Figure 1:
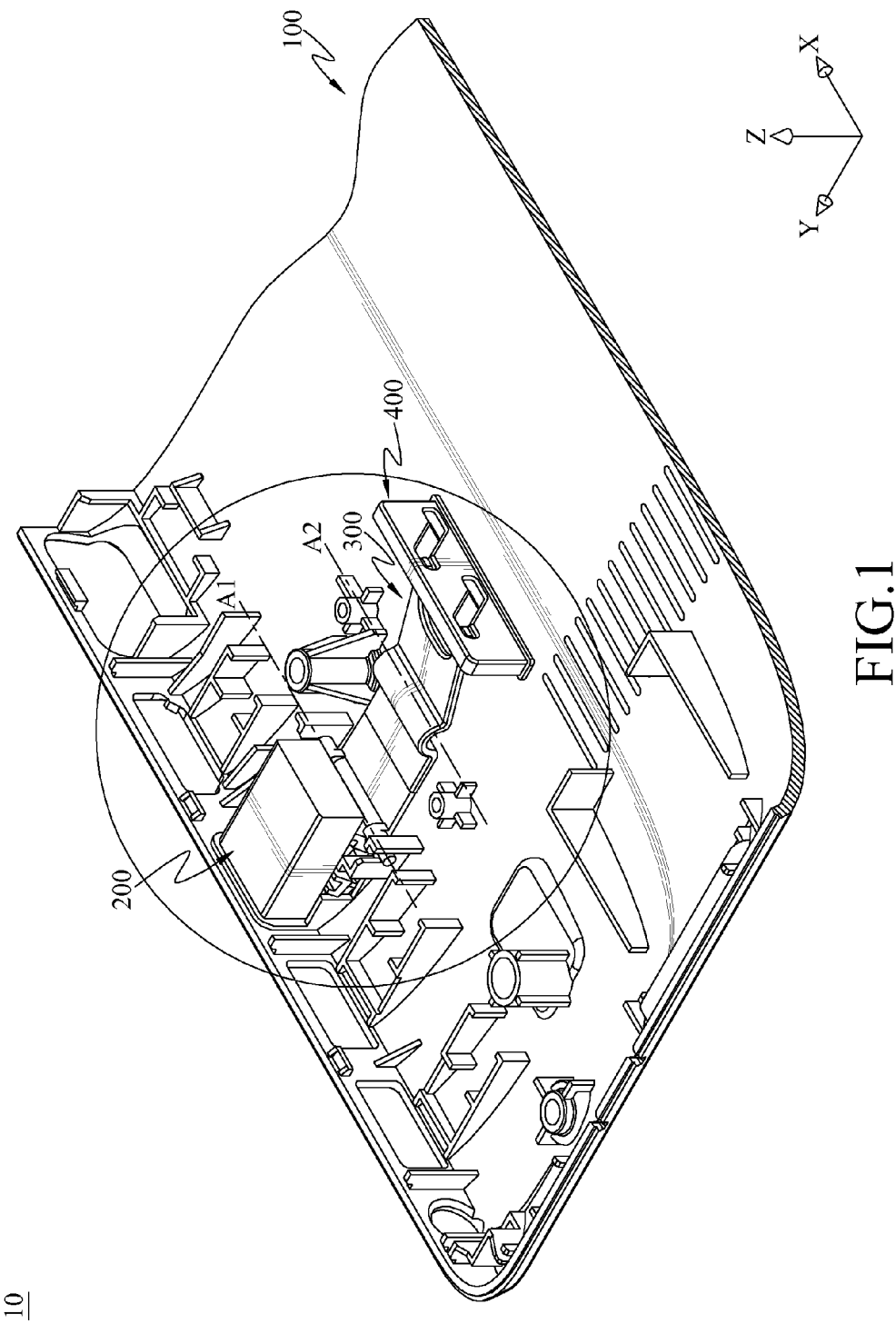
FIG. 1 is a connection mechanism installed on inside of a case of an electronic device according to the first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
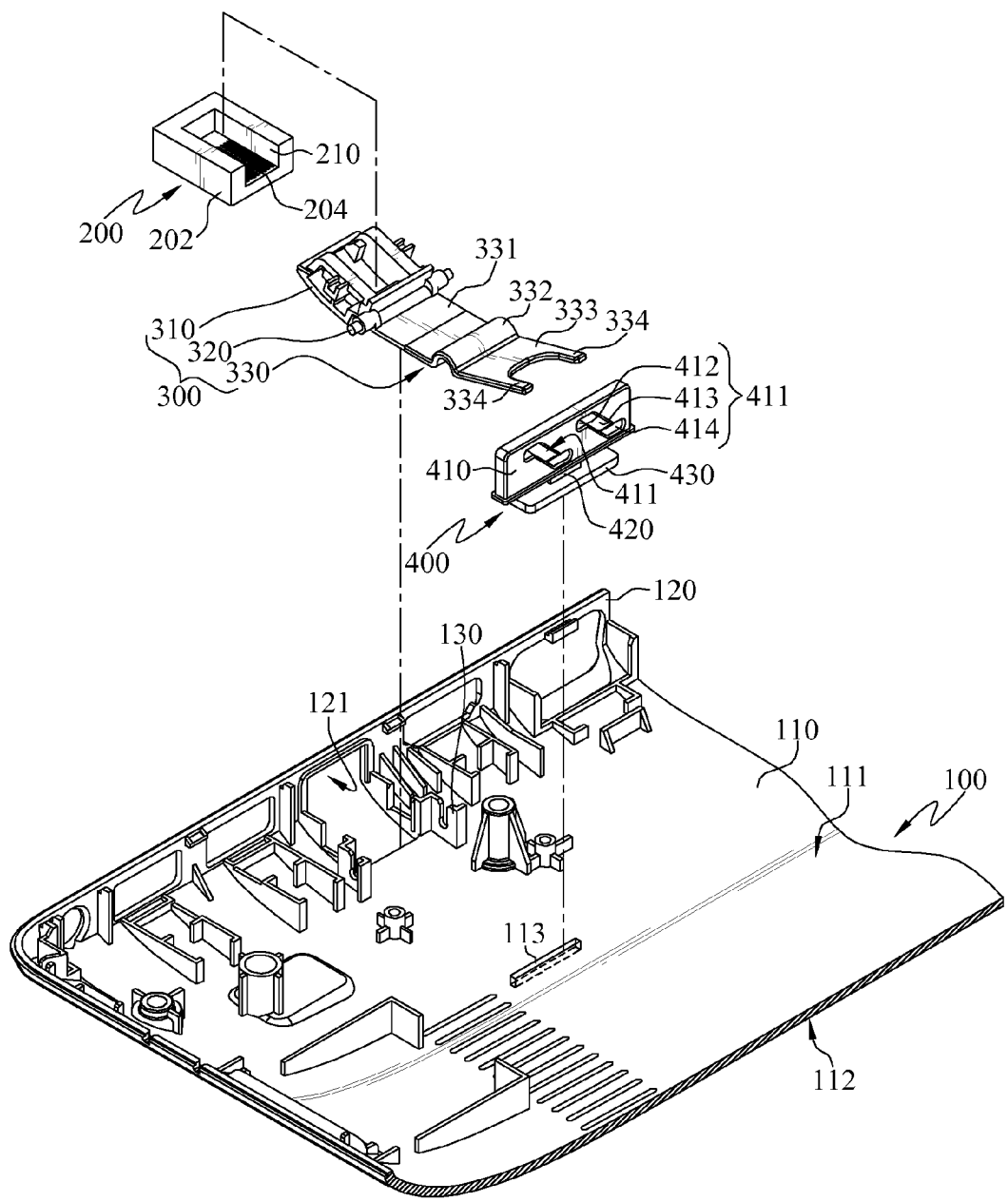
FIG. 2 is an exploded view of FIG. 1.
Figure 3A:
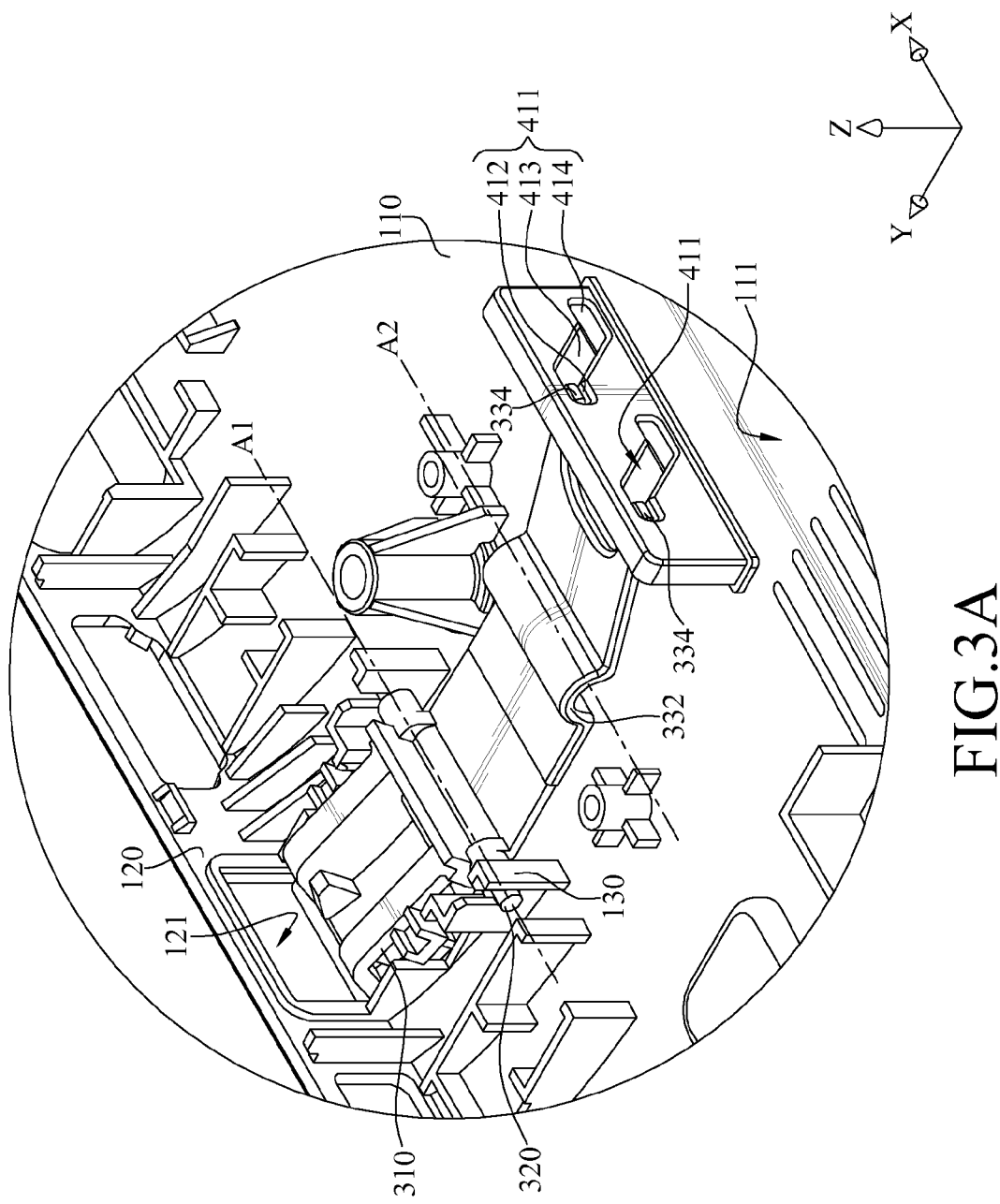
FIGS. 3A, 3B, 4A and 4B are schematic views of the operation of the connection mechanism of FIG. 1.
Figure 3B:
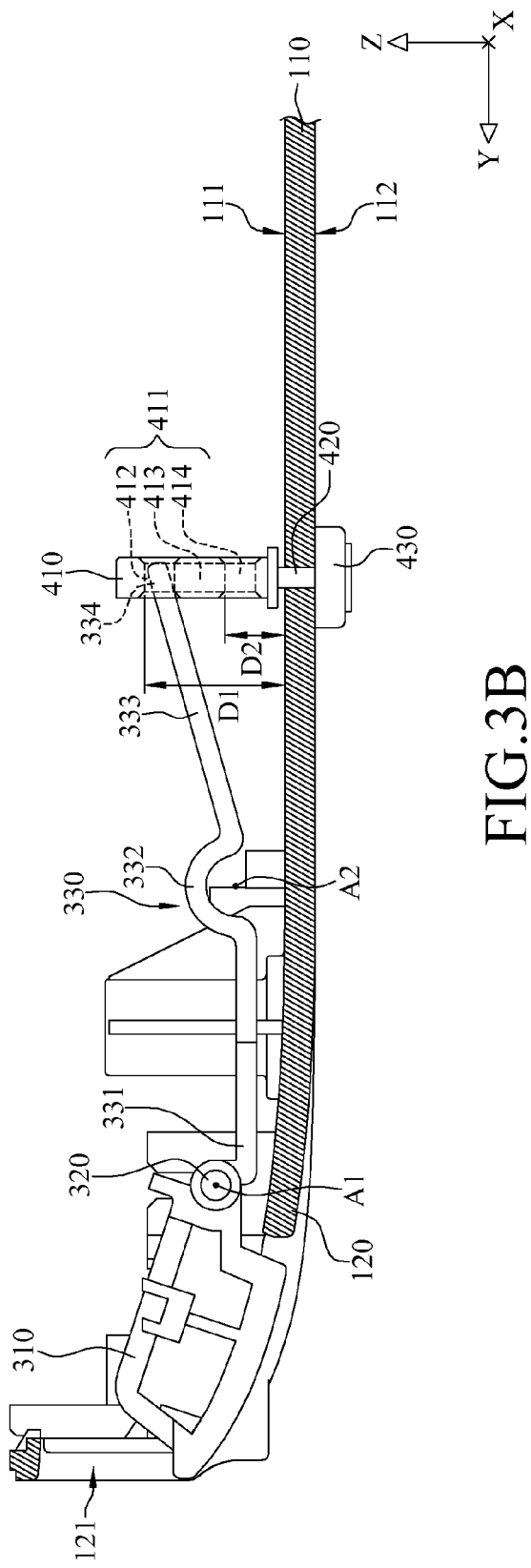

FIG. 1 is a connection mechanism installed on inside of a case of an electronic device according to the first embodiment of the disclosure; FIG. 2 is an exploded view of FIG. 1; FIG. 3A to FIG. 4A are schematic views of the operation of the connection mechanism of FIG. 1. As seen in FIG. 1, FIG. 2 and FIG. 3B, in this embodiment, a connector mechanism 10 is used for being installed on a case 100 of an electronic device. The connector mechanism 10 comprises an electrical connector 200, a cover member 300 and an elasticity-adjusting member 400. The case 100 of this embodiment is a case of a laptop, but it is not limited thereto. In other embodiments, the case 100 may be a case of a tablet computer. The case 100 comprises a bottom plate 110, a lateral plate 120 and a pivoting base 130. The bottom plate 110 has a carrying surface 111, a bottom surface 112 and a sliding groove 113. The bottom surface 112 is opposite to the carrying surface 111. The sliding groove 113 is formed between the carrying surface 111 and the bottom surface 112. The lateral plate 120 is connected to the bottom plate 110 (may be formed as a single unit) and has an opening 121. The pivoting base 130 is connected to the carrying surface 111 of the bottom plate 110, but the disclosure is not limited thereto. In other embodiments, the pivoting base 130 may be connected to the lateral plate 120.

In this embodiment, the electrical connector 200 is a half-sized RJ45 slot for example. The electrical connector 200 comprises an insulation base 202 in a reverse-U shape and an insulation base 202 together forming a slot the slot 210. A plurality of conductive terminals 204 is installed on inner sides of the insulation base 202. The electrical connector 200 is disposed on the top of the case 100 corresponding to the opening 121 of the lateral plate 120. The opening 121 of the lateral plate 120 corresponds to the slot 210 and exposes it.

The cover member 300 comprises a cover portion 310, a pivoting portion 320 and an elastic portion 330 all connected together. The pivoting portion 320 is located between the elastic portion 330 and the cover portion 310. Additionally, the pivoting portion 320 is pivotally disposed on the pivoting base 130 for making the cover portion 310 rotate relative to the case 100 around an axis A1 (namely, parallel to X axis of the three-dimensional coordinate system). Specifically, in this embodiment, the pivoting portion 320 has two protruding axles, while the pivoting base 130 has two pivoting holes. The two protruding axles are pivoted on the two pivoting holes. The centerlines of the two protruding axles are parallel to the axis A1, so that the cover portion 310 can rotate relative to the case 100 around the axis A1 as a centerline of rotation. However, the connecting method is not limited thereto. In other embodiments, the axles and the pivoting holes are interchangeable. The elastic portion 330 provides an elastic force so that the cover portion 310 at least covers a part of the opening 121. The elastic portion 330 has a connecting end 331 and a moving end 333 that are opposite to each other, while the connecting end 331 is connected to the pivoting portion 320. In this embodiment, the elastic portion 330 further has a bent structure 332 located between the connecting end 331 and the moving end 333. The bent structure 332 curves around a centerline of curvature A2 parallel to the axis A1. The arrangement of the bent structure 332 may buffer the deformation of the elastic portion 330. The elastic portion 330 comprises the two extending rods 334 located on the moving end 333 and extend outward. In this embodiment, the two extending rods 334 in the normal state are away from the carrying surface 111 of the bottom plate 110 and thus hold elastic potential energy. When the two extending rods 334 are influenced by an external force to be close to the carrying surface 111, the elastic portion 330 has compressive deformation which increases the elastic potential energy of the elastic portion 330. On the other hand, when the two extending rods 334 are away from the carrying surface 111 and tilted, the elastic potential energy of the elastic portion 330 is decreased.

The elasticity-adjusting member 400 is configured to move back and forth relative to the bottom plate 110 along a first direction parallel to the axis A1 (namely parallel to the three-dimensional coordinate system). Thereby, the two extending rods 334 is guided to slide, relative to the guiding groove 411, to the first locating section 412 higher than the second locating section 414 or to the second locating section 414 lower than the first locating section 412, thereby changing the elastic value of the elastic portion 330.

Specifically, the elasticity-adjusting member 400 comprises a wall portion 410, a sliding rail portion 420 and a push portion 430. The extending directions of the wall portion 410 and the sliding groove 113 are parallel to the first direction. The sliding rail portion 420 is located between the wall portion 410 and the push portion 430. The sliding rail portion 420 is slidably disposed in the sliding groove 113 while the push portion 430 and the wall portion 410 are located on the opposite two sides of the bottom plate 110 respectively, so that the elasticity-adjusting member 400 is capable of moving back and forth along the first direction. Besides, the push portion 430 enables the users to adjust the elastic value of the elastic portion 330. The wall portion 410 has two guiding grooves 411. Each guiding groove 411 has a first locating section 412, a guiding section 413 and a second locating section 414. The opposite two ends of the guiding section 413 are connected to the first locating section 412 and the second locating section 414, respectively. The distance D1 from the first locating section 412 to the carrying surface 111 is greater than the distance D2 from the second locating section 414 to the carrying surface 111 (as shown in FIG. 3B). The distance from the end of the two extending rods 334 unstressed to the carrying surface 111 is equal to the distance D1 from the first locating section 412 to the carrying surface 111, or preferably greater than the distance D1 for better performance. The two extending rods 334 are respectively located inside the two guiding grooves 411 in a slidable way, while the elasticity-adjusting member 400 can slide relative to the case 100 for guiding the two extending rods 334 to slide to the first locating section 412 or to the second locating section 414. The displacement of the downward movement from the two extending rods 334 at the first locating section 412 to the initial position of the two extending rods 334 which is unstressed is less than that from the two extending rods 334 at the second locating section 414 to the initial position of the two extending rods 334 unstressed. Thereby, when the two extending rods 334 at the second locating section 414, the elastic portion 330 is stressed and its elastic potential energy increases, which give the cover portion 310 a greater restitutive force.

The push portion 430 of this embodiment, however, does not limit the disclosure. In other embodiment, it is possible that the push portion 430 is not used, while the sliding groove 113 can be designed as not running through the bottom plate 110. Additionally, in this embodiment, the guiding groove 411 can perform the two-stage positioning, but it is not limited thereto. In other embodiments, the guiding groove 411 may perform multiple-stage positioning. For example, in one embodiment, the guiding groove 411 has more than three locating sections (in a stepped shape).

FIG. 3A to FIG. 4B are schematic views of the operation of the connection mechanism of FIG. 1. As seen in FIG. 3A to FIG. 4B, when the elasticity-adjusting member 400 is at a first position, the two extending rods 334 are limited to the first locating section 412 at higher position by the guiding groove 411, thereby changing the amount of elastic deformation. Based on this amount of deformation amount, the elastic portion 330 may generate a first elastic value for the cover portion 310 to have restitutive force.

Figure 4A:
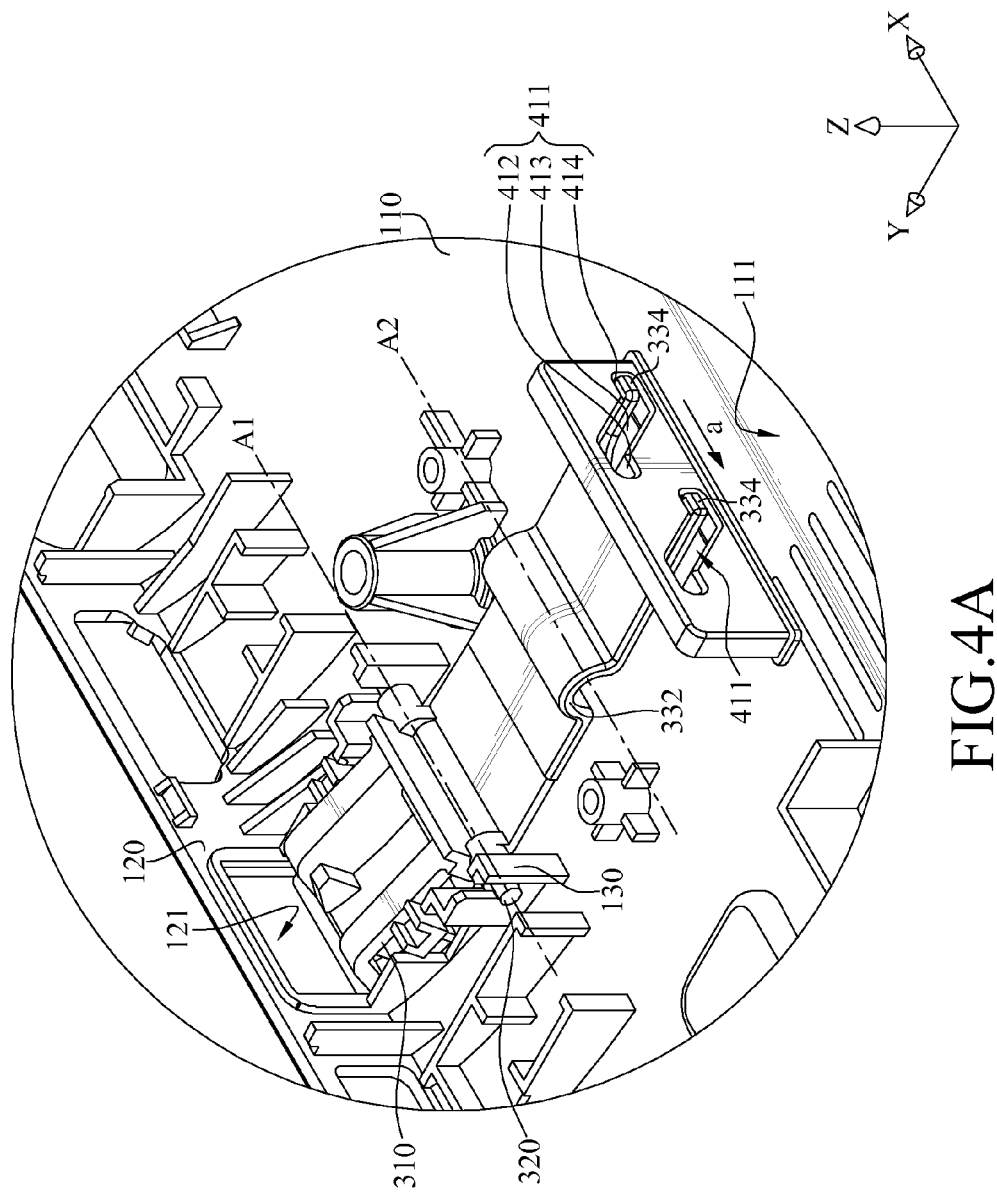
Figure 4B:
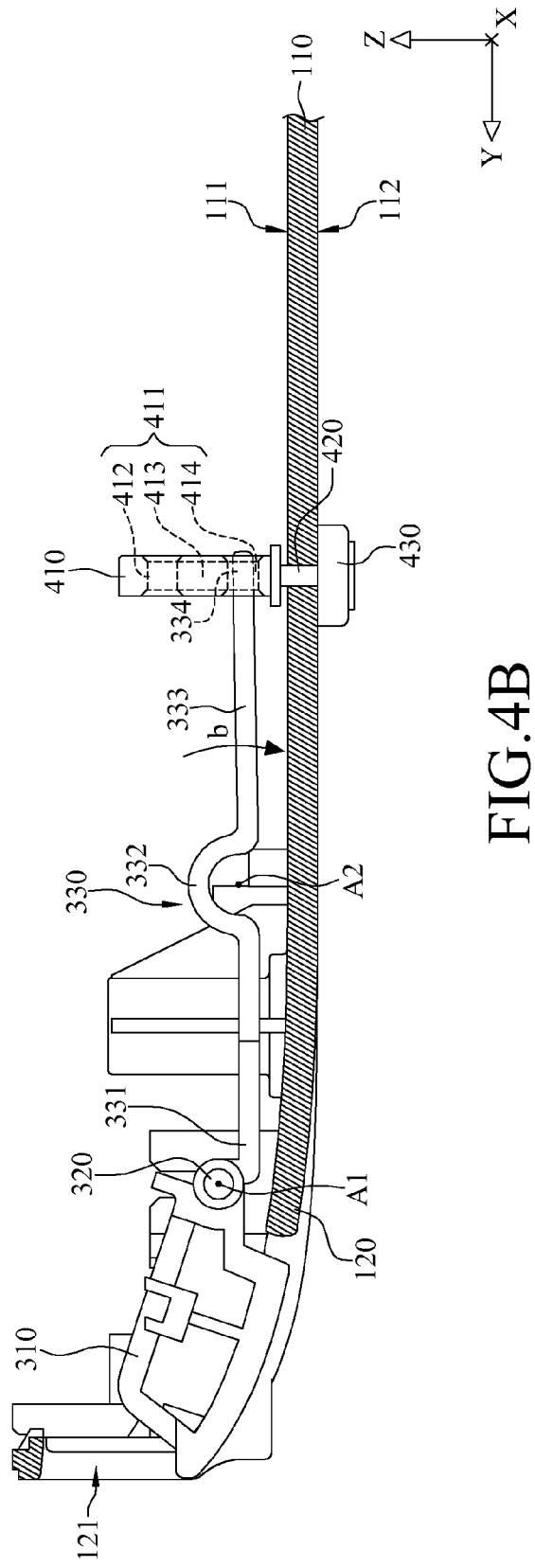

As seen in FIG. 4A to FIG. 4B, the elasticity-adjusting member 400 is pushed (along the direction of arrow a) for making the elasticity-adjusting member 400 move from the first position to the second position. Compared to being at the first position, when the elasticity-adjusting member 400 is at the second position, the two extending rods 334 are guided to the second locating section 414, which is closer to the carrying surface 111 and at a lower position (along the direction of arrow b), and this increases the amount of elastic deformation. Due to the increased elastic deformation amount, the elastic portion 330 generates a second elastic value which is greater than the first elastic value, so that the cover portion 310 has a greater restitutive force.

As illustrated above, the users can adjust the position of the elasticity-adjusting member 400 to change the elastic value of the elastic portion 330, thereby adjusting the restitutive force of the cover portion 310. For instance, when the restitutive force of the cover portion 310 fails to meet the requirement, the users can adjust the elasticity-adjusting member 400 to the second position for improving the restitutive force of the cover portion 310. In contrast, when the restitutive force of the cover portion 310 is too strong, the users can adjust the elasticity-adjusting member 400 to the first position for reducing the restitutive force of the cover portion 310.

Figure 5:
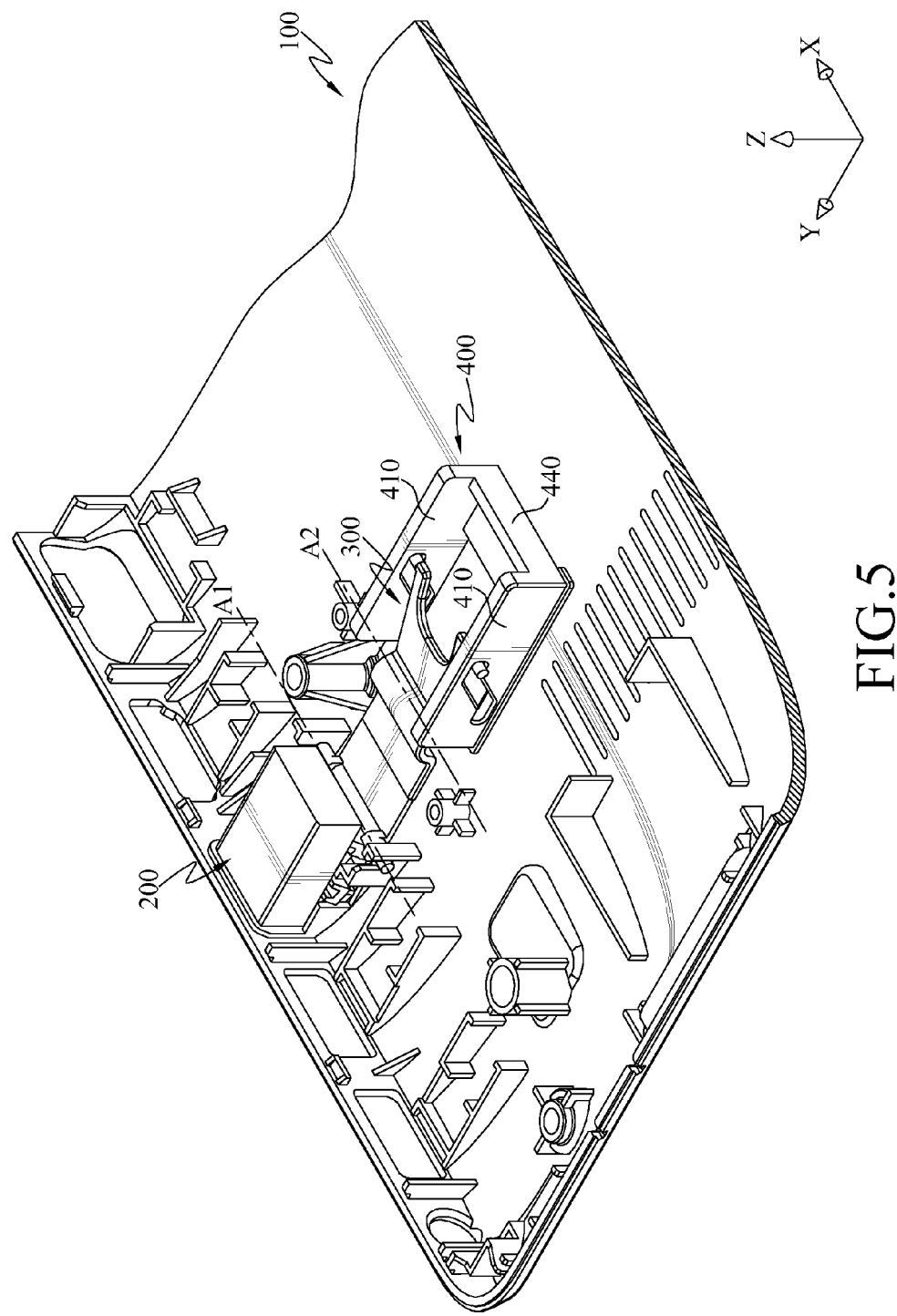
FIG. 5 is a connection mechanism installed on inside of a case of an electronic device according to the second embodiment of the disclosure.
Figure 6:
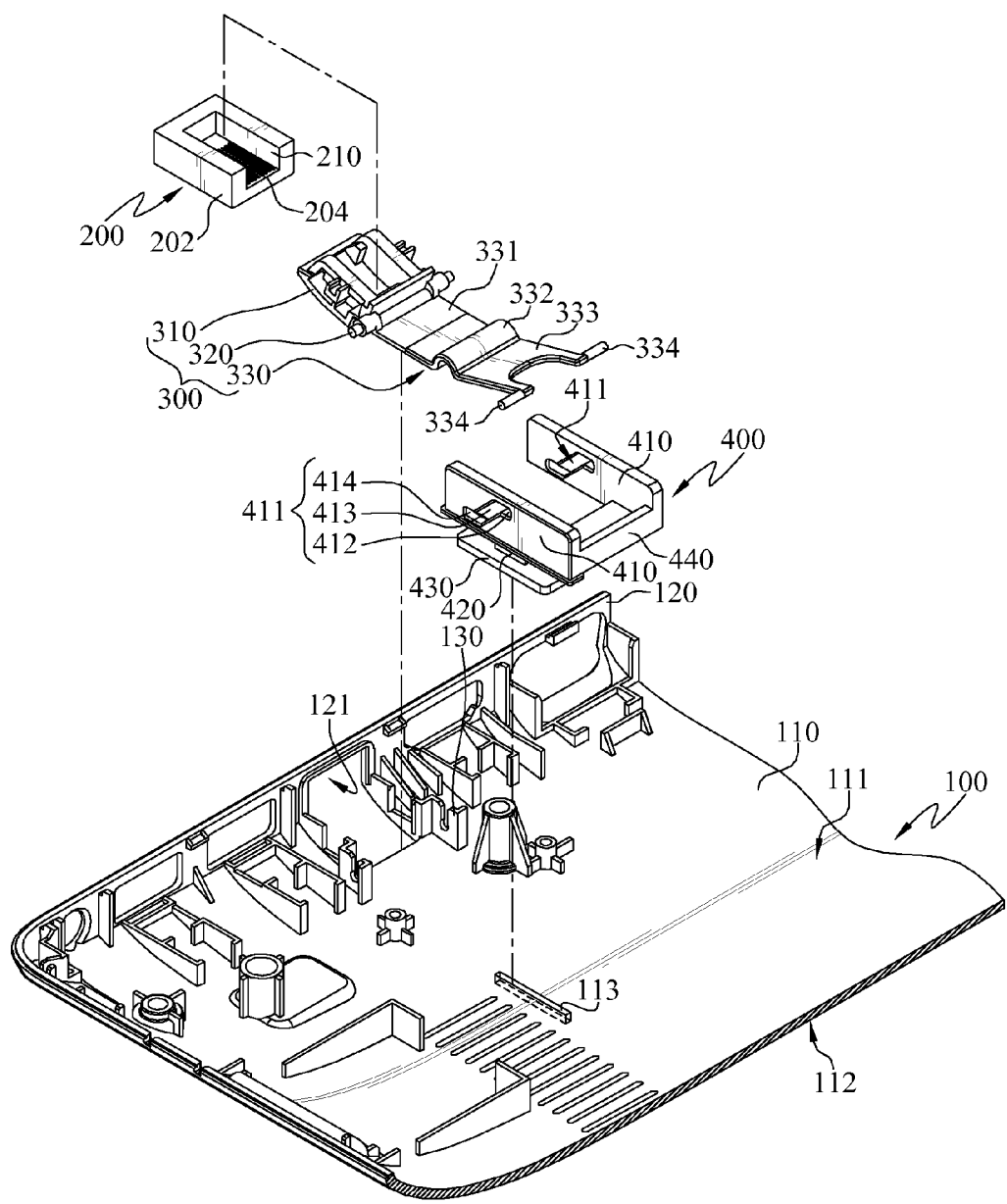
FIG. 6 is an exploded view of FIG. 5.
Figure 7:
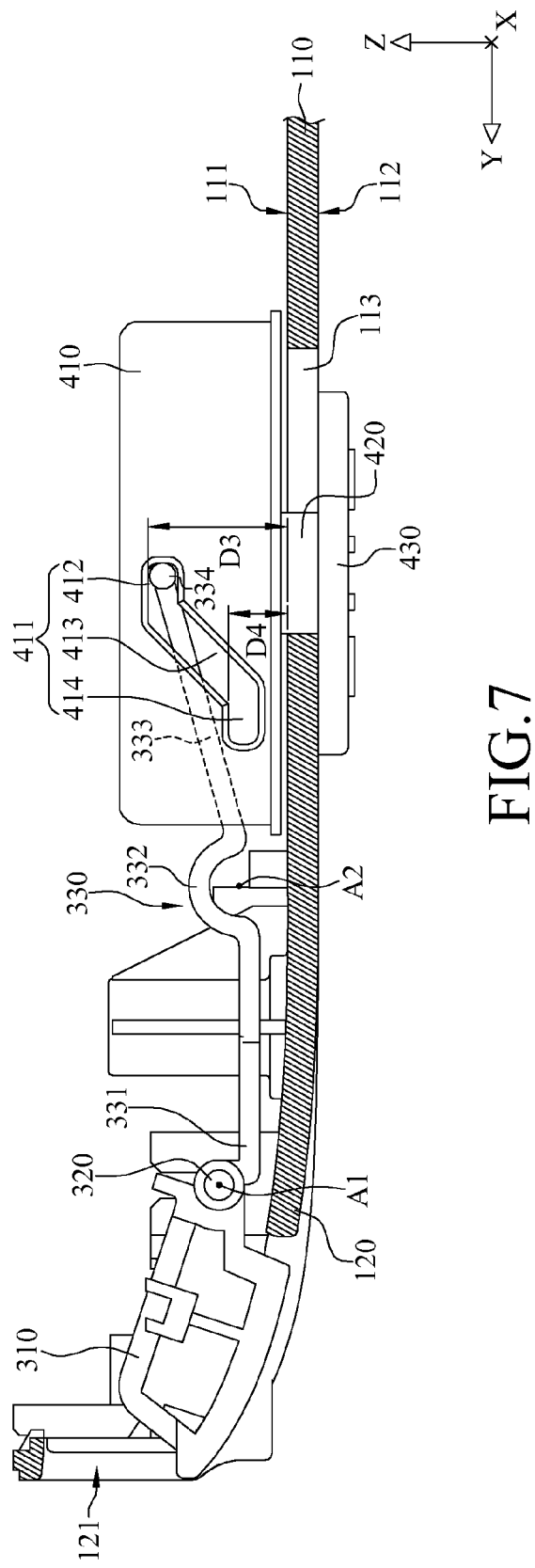
FIG. 7 to FIG. 8 are schematic views of the operation of the connection mechanism of FIG. 5.

FIG. 5 is a connection mechanism installed on inside of a case of an electronic device according to the second embodiment of the disclosure; FIG. 6 is an exploded view of FIG. 5; FIG. 7 is a schematic views of the operation of the connection mechanism of FIG. 5. As seen in FIG. 5 to FIG. 7, this embodiment is similar to the embodiment of FIG. 1 and only the difference between them will be illustrated.

In this embodiment, the elasticity-adjusting member 400 may move back and forth relative to the bottom plate 110 along a second direction perpendicular to the axis A1 and parallel to the carrying surface 111 (namely, parallel to Y axis of the three-dimensional coordinate system), thereby guiding the two extending rods 334 slide to the first locating section 412 or the second locating section 414 relative to the guiding groove 411, for changing the elastic value of the elastic portion 330.

Specifically, the elasticity-adjusting member 400 comprises two wall portions 410, a sliding rail portion 420, a push portion 430 and a link portion 440. The two wall portions 410 are located on the opposite two sides of the moving end 333 of the elastic portion 330, and the extending directions of the two wall portions 410 and the sliding groove 113 are parallel to the second direction. The link portion 440 is connected to the two wall portions 410, while the sliding rail portion 420 is located between one of the two wall portions 410 and the push portion 430. The sliding rail portion 420 is disposed in the sliding groove 113 in a slidable way, and the push portion 430 and the two wall portions 410 are located on opposite sides of the bottom plate 110, respectively, thereby making the elasticity-adjusting member 400 be able to move back and forth along the second direction. The two wall portions 410 each has a guiding groove 411. Each guiding groove 411 has a first locating section 412, a guiding section 413 and a second locating section 414. The opposite ends of the guiding section 413 are connected to the first locating section 412 and the second locating section 414, respectively. The distance D3 from the first locating section 412 to the carrying surface 111 is greater than the distance D4 from the second locating section 414 to the carrying surface 111 (as shown in FIG. 7). The distance from the ends of the two extending rods 334 unstressed to the carrying surface 111 is equal to or preferably greater than the distance D3 from the first locating section 412 to the carrying surface 111. The two extending rods 334 are located in the two guiding grooves 411, respectively, while the elasticity-adjusting member 400 can slide relative to the case 100 for guiding the two extending rods 334 to slide to the first locating section 412 at the higher position or the second locating section 414 at the lower position. Since the displacement of downward movement of the two extending rods 334 at the first locating section 412 is less than that of the two extending rods 334 at the second locating section 414, the two extending rods 334 at the second locating section 414 increase elastic potential energy of the elastic portion 330, which give the cover portion 310 a greater restitutive force.

Figure 8:
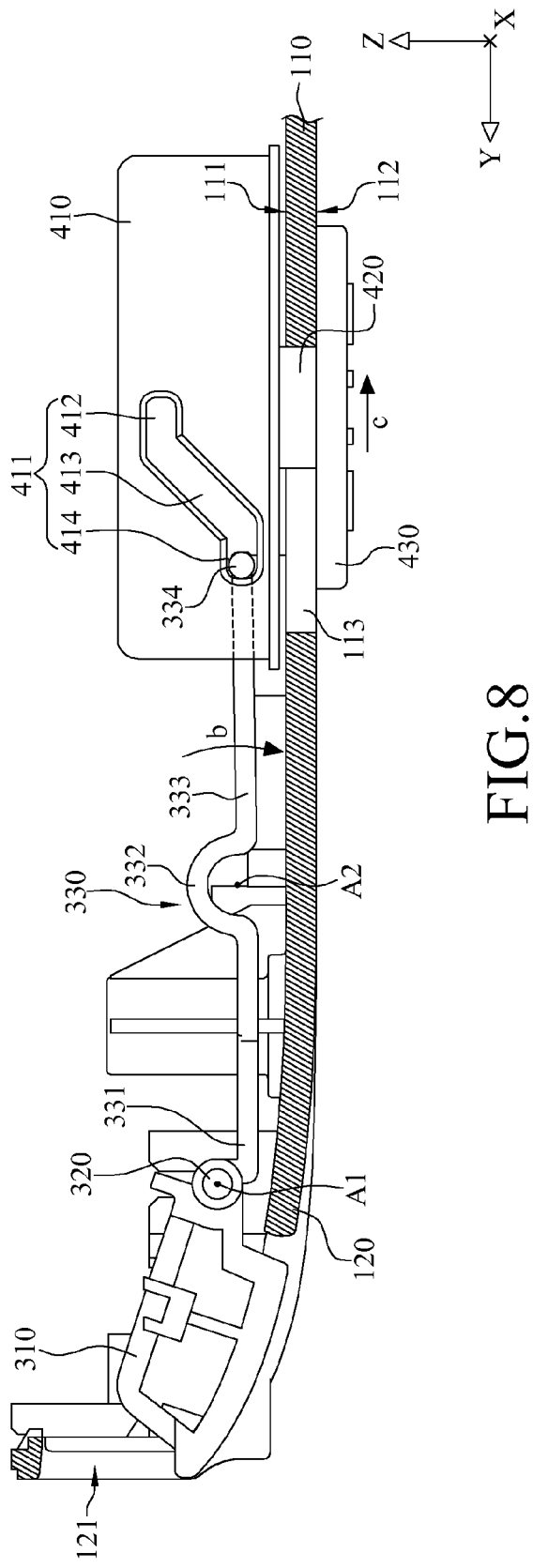

FIG. 7 to FIG. 8 are schematic views of the operation of the connection mechanism of FIG. 5. As seen in FIG. 7, when the elasticity-adjusting member 400 is at the first position, the two extending rods 334 are limited to the first locating section 412 at higher position by the guiding groove 411, thereby changing the amount of elastic deformation of the elastic portion 330. Based on this amount of elastic deformation, the elastic portion 330 may generate a first elastic value for the cover portion 310 to have restitutive force.

As seen in FIG. 8, the elasticity-adjusting member 400 is pushed (along the direction of arrow c) for making the elasticity-adjusting member 400 move from the first position to the second position. Compared to being at the first position, when the elasticity-adjusting member 400 is at the second position, the two extending rods 334 are guided to the second locating section 414 which is closer to the carrying surface 111 and at the lower position (along the direction of arrow b) and this increases the elastic deformation amount of the elastic portion 330. Due to the increased elastic deformation amount, the elastic portion 330 generates a second elastic value which is greater than the first elastic value, so that the cover portion 310 has a greater restitutive force.

Figure 9:
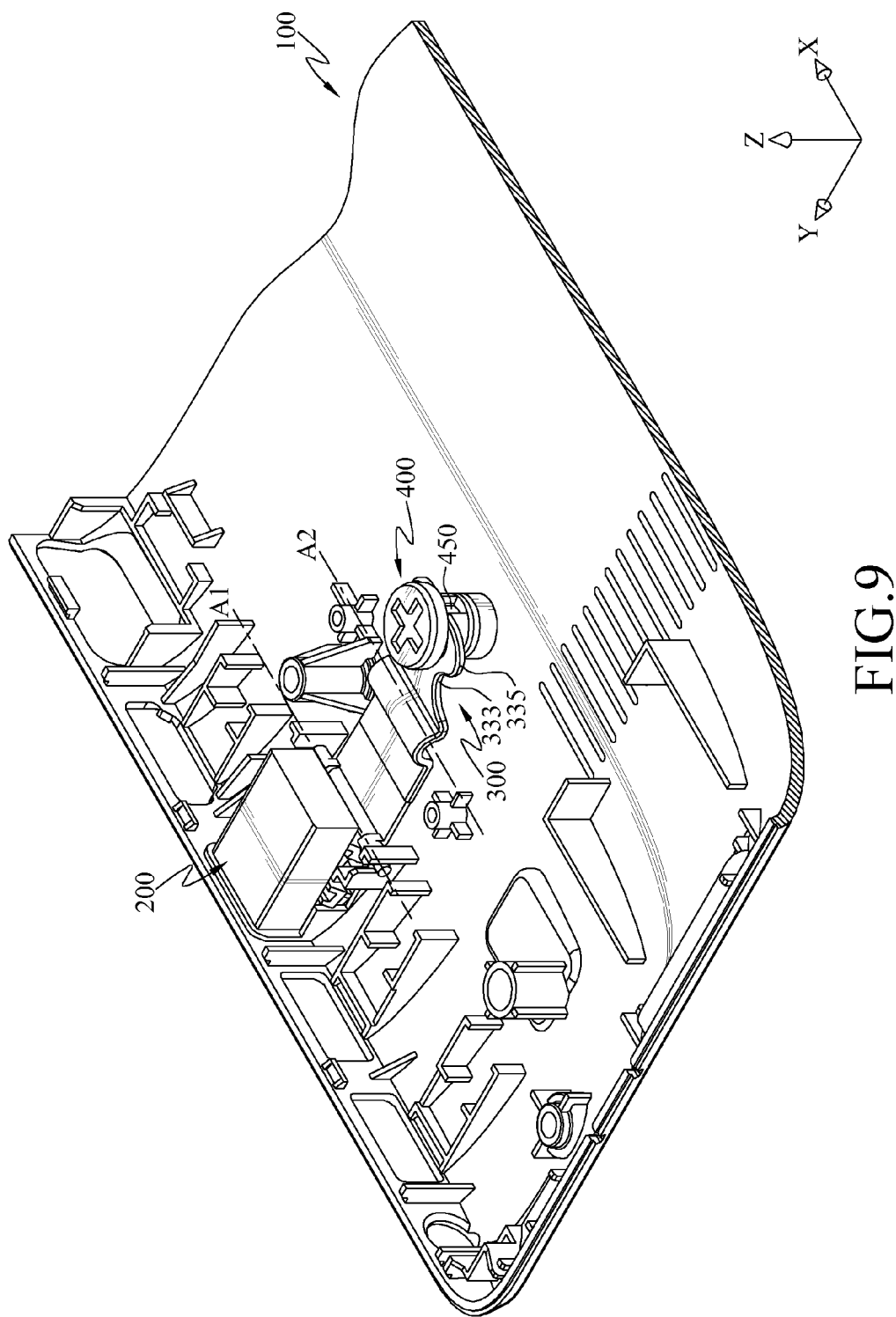
FIG. 9 is a connection mechanism installed on inside of a case of an electronic device according to the third embodiment of the disclosure.
Figure 10:
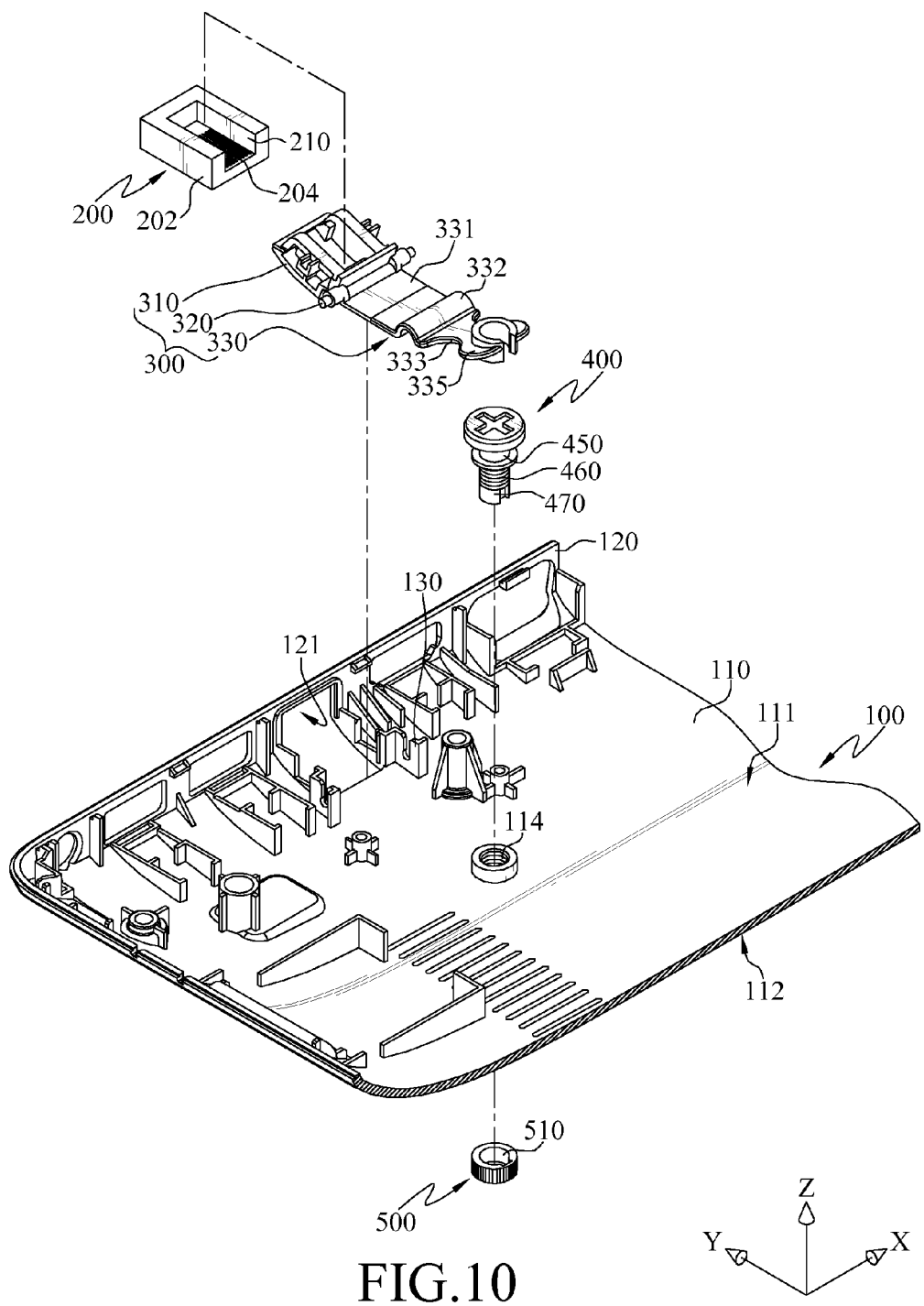
FIG. 10 is an exploded view of FIG. 9.

FIG. 9 is a connection mechanism installed on inside of a case of an electronic device according to the third embodiment of the disclosure; FIG. 10 is an exploded view of FIG. 9. As seen in FIG. 9 to FIG. 10, this embodiment is similar to the embodiment of FIG. 1 and only the difference between them will be illustrated.

In this embodiment, the bottom plate 110 comprises a first screwing portion 114 located on the carrying surface 111.

The axis A1 of the first screwing portion 114 is parallel to a third direction. The elastic portion 330 comprises a fastening portion 335 located on the moving end 333.

The elasticity-adjusting member 400 can move relative to the bottom plate 110 along the third direction parallel to the normal vector of the carrying surface 111 (namely, parallel to Z axis of the three-dimensional coordinate system). Specifically, the elasticity-adjusting member 400 comprises a slot portion 450, a second screwing portion 460 and a fastening portion 470 connected together. The second screwing portion 460 is located between the slot portion 450 and the fastening portion 470. The second screwing portion 460 is screwed to the first screwing portion 114 for making the elasticity-adjusting member 400 be able to move relative to the bottom plate 110 along the third direction. The slot portion 450 has a groove 451 having a first side 452 and a second side 453. The distance D5 from the first side 452 to the carrying surface 111 is greater than the distance D6 from the second side 453 to the carrying surface 111. The fastening portion 335 is located in the groove 451 and is between the first side 452 and the second side 453. The slot portion 450 can move relative to the bottom plate 110 via the first screwing portion 114 and the second screwing portion 460 for making the first side 452 and the second side 453 drive the fastening portion 335 to move close to or away from the bottom plate 110, thereby changing the elastic deformation amount of the elastic portion 330. The fastening portion 470 penetrates the first screwing portion 114 and protrudes from the bottom surface 112.

The rotary button 500 has a fastening groove 510. The fastening groove 510 of the rotary button 500 is fastened with the fastening portion 470, which enables users to adjust the distance between the fastening portion 335 and the carrying surface 111 via the rotary button 500. This changes the elastic deformation amount of the elastic portion 330, thereby adjusting the restitutive force of the cover portion 310.

Figure 11:
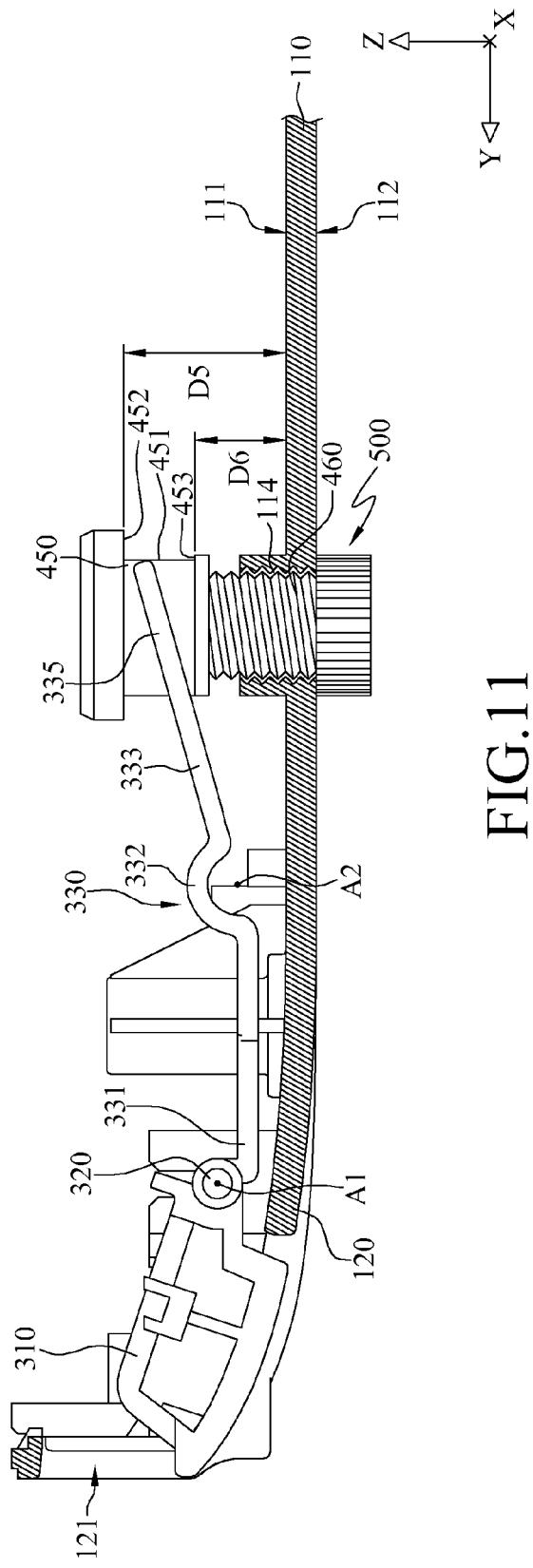
FIG. 11 to FIG. 12 are schematic views of the operation of the connection mechanism of FIG. 9.
Figure 12:
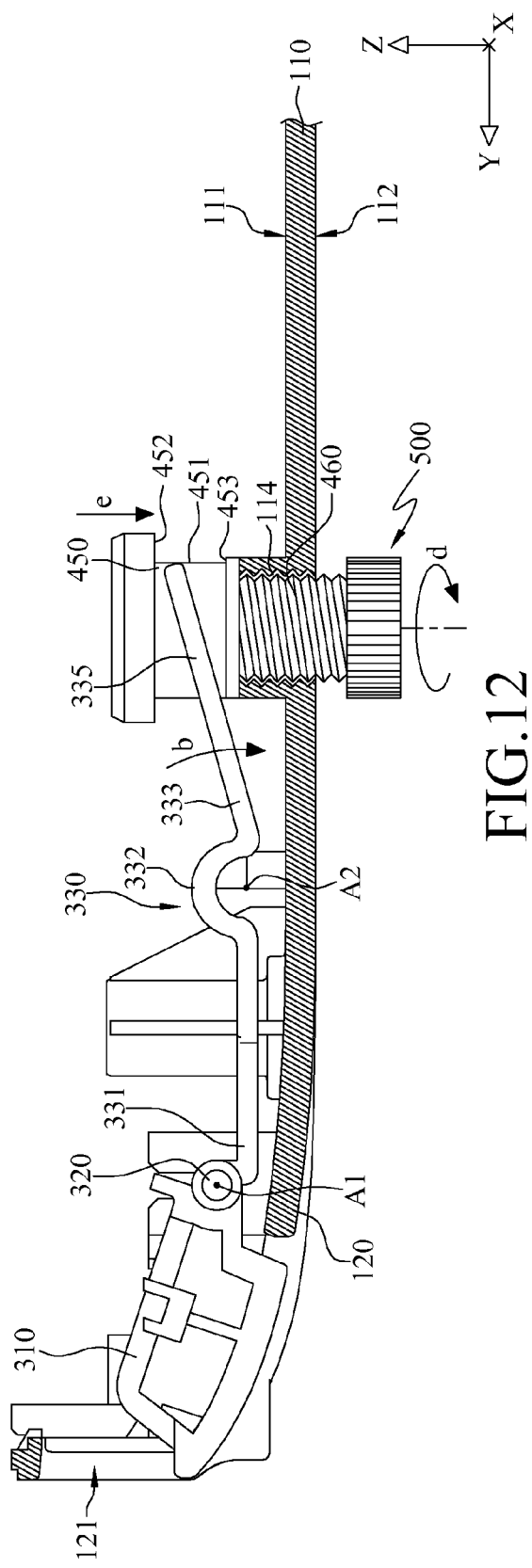

FIG. 11 to FIG. 12 are schematic views of the operation of the connection mechanism of FIG. 9. As seen in FIG. 11, when the elasticity-adjusting member 400 is at the first position, the fastening portion 335 of the elastic portion 330 is limited to the first position by the first side 452 of the groove 451, and the elastic portion 330 generates a first elastic value based on the elastic deformation amount of the elastic portion 330. Thereby, the cover portion 310 can have the restitutive force.

As seen in FIG. 12, rotating the elasticity-adjusting member 400 clockwise (along the direction of arrow d) makes the elasticity-adjusting member 400 move from the first position to the second position (along the direction of arrow e). Compared to being at the first position, when the elasticity-adjusting member 400 is at the second position, the fastening portion 335 is pressed by the first side 452 of the groove 451 to the second position closer to the carrying surface 111 (along the direction of arrow b), thereby increasing the amount of elastic deformation of the elastic portion 330. The elastic portion 330, therefore, generates a second elastic value greater than the first elastic value, so that the cover portion 310 has a greater restitutive force.

To sum up, in the connection mechanism and the electronic device comprising the same, when the elasticity-adjusting member moves relative to the case, the groove of the elasticity-adjusting member drives the moving end of the elastic portion to move close to or away from the bottom plate. Thereby, the elastic deformation value is changed and this can adjust the restitutive force of the cover portion. In other words, the movement of the elasticity-adjusting member drives the moving end of the elastic portion to deform to different extents with different elastic values, thereby adjusting the restitutive force of the cover portion accordingly. This way, assemblers can adjust the restitutive force of the cover portion for making the connection mechanism suitable for different electronic devices which require different elastic forces, thereby improving the efficiency of assembly.

Moreover, when the elastic fatigue of the elastic portion causes the restitutive force of the cover portion to decrease, the users can use the elasticity-adjusting member to restore the elastic force of the elastic portion, thereby maintaining the restitutive force of the cover portion. Thereby, the users no longer need to send the electronic device for repair simply because the restitutive force of the cover portion is reduced.

What is claimed is:

1. An electronic device comprising:
a case comprising a bottom plate, a lateral plate and a pivoting base, wherein the lateral plate is connected to the bottom plate, the lateral plate has an opening and the pivoting base is connected to the lateral plate; and
a connector mechanism comprising:
an electrical connector comprising an insulating base and a plurality of conductive terminals installed in the insulating base, wherein a slot is formed in the insulating base and exposed to the opening;
a cover member comprising a cover portion, a pivoting portion and an elastic portion all connected together, wherein the pivoting portion is positioned between the elastic portion and the cover portion while being disposed on the pivoting base, thereby enabling the cover member to be pivotally disposed on the case near the opening and to face the electrical connector, so that the cover portion is configured to rotate relative to the case around an axis and to cover at least a part of the opening upon an elastic force operated by the elastic portion which has a moving end away from the pivoting portion; and
an elasticity-adjusting member configured to move relative to the case and to be interfered with the moving end of the elastic portion, wherein the elastic portion deforms with different elasticity value in response to the movement of the elasticity-adjusting member, thereby adjusting the restitutive force of the cover portion accordingly.

2. The electronic device according to claim 1, wherein the bottom plate has a carrying surface, the cover member and the elasticity-adjusting member are located on the carrying surface, the elasticity-adjusting member is configured to move relative to the bottom plate along a first direction which is parallel to the axis.

3. The electronic device according to claim 2, wherein the elasticity-adjusting member is configured to move at least between a first position and a second position, so as to make the moving end deform at least with a first deformation value and a second deformation value respectively, thereby causing the elastic portion to at least have a first elasticity value and a second elasticity value respectively.

4. The electronic device according to claim 3, wherein:
the elasticity-adjusting member comprises a wall portion having a guide groove, the guide groove at least has a first locating section, a guide section and a second locating section, wherein the opposite two ends of the guide section are respectively connected to the first locating section and the second locating section, and the distance from the first locating section to the carrying surface is greater than the distance from the second locating section to the carrying surface; and the elastic portion comprises an extending rod located on the moving end and slidably located in the guide groove, the elasticity-adjusting member is configured to move back and forth between the first position and the second position, relative to the bottom plate along the first direction, so that the elastic force of the elastic portion is changed to the first elastic value or the second elastic value accordingly.

5. The electronic device according to claim 4, wherein the bottom plate comprises a sliding groove, the extending direction of the sliding groove is parallel to the first direction, the elasticity-adjusting member comprises a sliding rail portion slidably disposed on the sliding groove and one end of the sliding rail portion is connected to the wall portion, so that the elasticity-adjusting member is configured to move back and forth between the first position and the second position along the first direction, in order to guide the extending rod to move to the first locating section or the second locating section along the guide groove.

6. The electronic device according to claim 5, wherein the bottom plate has a bottom surface facing the carrying surface, the sliding groove is formed between the bottom surface and the carrying surface, the elasticity-adjusting member further comprises a push portion connected to one end of the sliding rail portion away from the wall portion, so that the push portion and the wall portion are located on the opposite two ends of the bottom plate, respectively.

7. The electronic device according to claim 1, wherein the elastic portion has a connecting end and a bent structure, one end of the connecting end is connected to the pivoting portion while the other end is connected to the bent structure so that the bent structure is located between the connecting end and the moving end, wherein the bent structure curves around a centerline of curvature, and the centerline of curvature is parallel to the axis.

8. The electronic device according to claim 1, wherein the bottom plate has a carrying surface, the cover member and the elasticity-adjusting member are located on the carrying surface, the elasticity-adjusting member is configured to move relative to the bottom plate along a first direction, and the first direction is perpendicular to the axis and is parallel to the carrying surface.

9. The electronic device according to claim 8, wherein:
the elasticity-adjusting member comprises two wall portions and a link portion, the two wall portion are respectively located on the opposite two ends of the moving end, the link portion is connected to the two wall portions, the two wall portions each has a guide groove at least having a first locating section, a guide section and a second locating section, and the distance from the first locating section to the carrying surface is greater than the distance from the second locating section to the carrying surface; and the elastic portion comprises two extending rods located on the moving end, the two extending rods respectively extend towards the two wall portions and are respectively located in the two guide grooves in a movable way, the elasticity-adjusting member is configured to move back and forth along the first direction for guiding the extending rod to slide to the first locating section or the second locating section, thereby changing the elastic value of the elastic portion.

10. The electronic device according to claim 8, wherein the bottom plate comprises two sliding grooves, the extending directions of the sliding grooves are parallel to the first direction, the elasticity-adjusting member comprises two sliding rail portions slidably disposed on the two sliding grooves and one end of each of the two sliding rail portions is connected to the wall portion, so that the elasticity-adjusting member is configured to move back and forth between the first position and the second position along the first direction in order to guide the two extending rods to move to the first locating section or the second locating section relative to the two guide grooves.

11. The electronic device according to claim 10, wherein the bottom plate has a bottom surface facing the carrying surface, the two sliding grooves are formed between the bottom surface and the carrying surface, the elasticity-adjusting member further comprises a push portion connected to one end of the sliding rail portion away from the wall portion, so that the push portion and the two wall portions are located on the opposite two ends of the bottom plate, respectively.

12. The electronic device according to claim 1, wherein the bottom plate has a carrying surface, the cover member and the elasticity-adjusting member are located on the carrying surface, and the elasticity-adjusting member moves relative to the bottom plate along a third direction parallel to the normal vector of the carrying surface.

13. The electronic device according to claim 12, wherein:
the bottom plate comprises a first screwing portion while the axis of the first screwing portion is parallel to the third direction, the elastic adjusting portion comprises a second screwing portion and a slot portion, and the second screwing portion is screwed to the first screwing portion; and the elastic portion comprises a fastening portion located on the moving end and fastened with the slot portion, the slot portion is configured to move relative to the bottom plate for driving the fastening portion to move close to or move away from the bottom plate, thereby changing the elastic value of the elastic portion.

14. The electronic device according to claim 13, wherein the slot portion has a groove, the groove has a first side and a second side, the distance from the first side to the carrying surface is greater than the distance from the second side to the carrying surface, and wherein the fastening portion is located in the groove and between the first side and the second side.

15. The electronic device according to claim 14, further comprising a rotary button, wherein the rotary button has a fastening groove, the bottom plate has a bottom surface, the bottom surface and the carrying surface are opposite to each other, the elasticity-adjusting member further comprises a fastening portion, the second screwing portion is located between the fastening portion and the slot portion, the second screwing portion runs through the first screwing portion for making the fastening portion protrude from the bottom surface, and the fastening groove of the rotary button is fastened with the fastening portion.

16. A connector mechanism, configured for being installed near an opening of a case, comprising:
an electrical connector comprising an insulating base and a plurality of conductive terminals installed on the insulating base, wherein a slot is formed in the insulating base and exposed to the opening;
a cover member comprising a cover portion, a pivoting portion and an elastic portion all connected together, wherein the pivoting portion is between the elastic portion and the cover portion while being disposed on the pivoting base, thereby enabling the cover member to be pivotally disposed on the case near the opening and to face the electrical connector, so that the cover portion is configured for rotating relative to the case around an axis as a rotational center for covering at least a part of the opening upon an elastic force operated by the elastic portion which has a moving end away from the pivoting portion; and an elasticity-adjusting member configured to move relative to the case and being interfered with the moving end of the elastic portion, wherein the elastic portion deforms with different elasticity value in response to the movement of the elasticity-adjusting member, thereby adjusting the restitutive force of the cover portion accordingly.

17. The connector mechanism according to claim 16, wherein:

the elasticity-adjusting member comprises at least one wall portion having a guide groove, the guide groove at least have a first locating section, a guide section and a second locating section, the opposite two ends of the guide section are respectively connected to the first locating section and the second locating section, and the distance from the first locating section to a bottom plate of the case is greater than the distance from the second locating section to the carrying surface; and the elastic portion comprises an extending rod located on the moving end and slidably located in the guide groove, the elasticity-adjusting member is configured to move back and forth relative to the bottom plate along a direction, so that the extending rod is driven to slide to the first locating section or the second locating section, thereby changing the elastic force of the elastic portion accordingly.

18. The connector mechanism according to claim 17, wherein the elasticity-adjusting member comprises a sliding rail portion slidably disposed on a sliding groove and one end of the sliding rail portion is connected to the wall portion, so that the elasticity-adjusting member is configured to move back and forth along the direction, in order to guide the extending rod to move to the first locating section or the second locating section along the guide groove.

19. The connector mechanism according to claim 18, wherein the elasticity-adjusting member further comprises a push portion connected to one end of the sliding rail portion away from the wall portion.

20. The connector mechanism according to claim 16, wherein the elastic portion has a connecting end and a bent structure, one end of the connecting end is connected to the pivoting portion while the other end is connected to the bent structure so that the bent structure is located between the connecting end and the moving end, the bent structure curves around a centerline of curvature, and the centerline of curvature is parallel to the axis.

21. The connector mechanism according to claim 16, wherein:

the elasticity-adjusting member comprises a second screwing portion and a slot portion connected together, the second screwing portion is configured for being screwed on a first screwing portion on a bottom plate of the case; and the elastic portion comprises a fastening portion located on the moving end, the fastening portion is configured for being fastened with the slot portion, the slot portion is configured to move relative to the bottom plate for driving the fastening portion to move close or move away from the bottom plate, thereby changing the elastic value of the elastic portion.

22. The connector mechanism according to claim 21, wherein the slot portion has a groove, the groove has a first side and a second side, the distance from the first side to the bottom plate is greater than the distance from the second side to the bottom plate, and the fastening portion is located in the groove and is between the first side and the second side.

23. The connector mechanism according to claim 22, further comprising a rotary button, wherein the rotary button has a fastening groove, the elasticity-adjusting member further comprises a fastening portion, the second screwing portion is located between the fastening portion and the slot portion, the second screwing portion runs through the first screwing portion for making the fastening portion protrude from the bottom surface, and the fastening groove of the rotary button is fastened with the fastening portion.

* * * * *